US009019093B2

(12) United States Patent
Wendt et al.

(10) Patent No.: US 9,019,093 B2
(45) Date of Patent: Apr. 28, 2015

(54) DEVICE AND METHOD FOR OUTPUTTING INFORMATION

(75) Inventors: Juergen Wendt, Weiterstadt (DE); Dennis Lohrengel, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 13/589,292

(22) Filed: Aug. 20, 2012

(65) Prior Publication Data

US 2013/0049943 A1 Feb. 28, 2013

(30) Foreign Application Priority Data

Aug. 20, 2011 (DE) .......................... 10 2011 111 213

(51) Int. Cl.
*B60Q 1/00* (2006.01)
*B60W 50/14* (2012.01)
*B60K 35/00* (2006.01)

(52) U.S. Cl.
CPC ................ *B60W 50/14* (2013.01); *B60K 35/00* (2013.01); *B60K 2350/1096* (2013.01); *B60W 2050/146* (2013.01); *B60W 2540/22* (2013.01)

(58) Field of Classification Search
CPC . G06F 9/405; H04L 63/0807; H04L 63/0815; H04L 9/3213; A61B 3/113; A61B 5/18; A61B 5/1114; G08G 5/0021
USPC .............. 340/439, 576, 575, 945, 573.1, 963; 701/45, 1, 36, 3
See application file for complete search history.

(56) References Cited

U.S. PATENT DOCUMENTS

| 6,344,793 | B1 | 2/2002 | Geck et al. | |
|---|---|---|---|---|
| 6,587,039 | B1 | 7/2003 | Woestemeyer et al. | |
| 6,892,116 | B2 * | 5/2005 | Geisler et al. | 701/1 |
| 6,974,414 | B2 * | 12/2005 | Victor | 600/300 |
| 7,639,148 | B2 * | 12/2009 | Victor | 340/576 |
| 8,040,258 | B2 * | 10/2011 | Ibrahim et al. | 340/961 |
| 8,487,775 | B2 * | 7/2013 | Victor et al. | 340/576 |
| 2003/0181822 | A1 * | 9/2003 | Victor | 600/558 |
| 2004/0070627 | A1 * | 4/2004 | Shahine et al. | 345/794 |
| 2004/0122562 | A1 * | 6/2004 | Geisler et al. | 701/1 |
| 2005/0030184 | A1 * | 2/2005 | Victor | 340/576 |
| 2005/0231529 | A1 * | 10/2005 | Skwarek et al. | 345/619 |
| 2007/0118816 | A1 * | 5/2007 | Yoshimura | 715/823 |
| 2010/0033333 | A1 * | 2/2010 | Victor et al. | 340/576 |
| 2010/0250657 | A1 * | 9/2010 | Urakawa | 709/203 |
| 2010/0253546 | A1 * | 10/2010 | Ibrahim et al. | 340/961 |
| 2010/0331654 | A1 * | 12/2010 | Jerdonek et al. | 600/365 |
| 2011/0242111 | A1 * | 10/2011 | Cupitt et al. | 345/470 |
| 2012/0075123 | A1 * | 3/2012 | Keinrath et al. | 340/963 |

(Continued)

*Primary Examiner* — Hoi Lau
(74) *Attorney, Agent, or Firm* — Ingrassia Fisher & Lorenz PC (57) ABSTRACT

A device and a method are provided for outputting items of information regarding a vehicle, in particular regarding a vehicle function. In order to impart the driver an improved knowledge of the vehicle functions, a first storage device, with which the items of information can be retrievably stored, a first device, with which a workload of the driver can be determined, a second device with which an associated priority can be provided to each item of information, and an output device are provided. If the determined workload undershoots a predeterminable limit workload, the item of information with the highest priority is output via the output device. The second device is embodied and equipped in such a manner, that following outputting of an item of information through the output device, the priority of this item of information is reduced.

15 Claims, 3 Drawing Sheets

(56) References Cited

U.S. PATENT DOCUMENTS

| | | | |
|---|---|---|---|
| 2012/0075124 A1* | 3/2012 | Whitlow et al. | 340/971 |
| 2012/0078445 A1* | 3/2012 | Krupansky et al. | 701/3 |
| 2012/0221961 A1* | 8/2012 | Reynolds | 715/752 |
| 2012/0242509 A1* | 9/2012 | Munehiro et al. | 340/963 |
| 2012/0319869 A1* | 12/2012 | Dorfmann et al. | 340/945 |
| 2013/0038614 A1* | 2/2013 | Dadi et al. | 345/501 |
| 2013/0049943 A1* | 2/2013 | Wendt et al. | 340/439 |
| 2013/0110349 A1* | 5/2013 | Tseng et al. | 701/36 |
| 2013/0147987 A1* | 6/2013 | Matsumoto et al. | 348/231.2 |
| 2013/0163745 A1* | 6/2013 | Ristock et al. | 379/265.12 |
| 2013/0214941 A1* | 8/2013 | Rogers et al. | 340/971 |
| 2014/0081519 A1* | 3/2014 | Prakah-Asante et al. | 701/36 |

\* cited by examiner

DEVICE AND METHOD FOR OUTPUTTING INFORMATION

CROSS-REFERENCE TO RELATED APPLICATION

This application claims priority to German Patent Application No. 10 2011 111 213.1, filed Aug. 20, 2011, which is incorporated herein by reference in its entirety.

TECHNICAL FIELD

The technical field relates to a device for outputting information regarding a vehicle, a method for controlling the device, a vehicle comprising such a device or in which such a method is carried out and the use of such a method or such a device.

BACKGROUND

The complexity of modern vehicles, vehicle systems and vehicle functions has steadily increased over the course of the last decades so that it can happen today that drivers do not comprehensively know the functionality that is present in a vehicle are therefore also not able to utilize to the full extent the provided potential of the vehicle, of its systems and functions. In the worst case, operating errors of the vehicle or its systems can occur, which can lead to dangerous situations or even accidents. To better inform the driver regarding his vehicle, methods and devices were proposed in the prior art.

Thus, a method for supporting a user of a motor vehicle in the operation of components of the motor vehicle and an associated device emerge, for example, from DE 199 07 795 A1. Here, a support questioning element is provided for an actuating element that would activate a component, i.e., ultimately triggers a function. Dependent on the actuation of this support questioning element, merely an item of information regarding the operating state that can be switched with this actuating element in normal operation is output for at least one following actuation of an actuation element of at least one component. However, this system already requires a first, at least superficial knowledge of the component or the associated actuating element, since otherwise no information regarding it can be requested by means of the support querying element.

Furthermore, a method for outputting operating instructions for a driver information device is disclosed in DE 199 55 890 A1. Here, a driver can request a help by means of input on an operating unit, for example by pressing a help key, upon which finally an operating instruction regarding a function is output. However, this method makes possible merely the targeted requesting of operating instructions regarding functions which are known in principle or the existence of which is at least known. Both methods mentioned above are not suitable for example to draw the attention of a driver to a function of the existence of which he substantially knows nothing, or the practical application of which is not known to him in the respective driving situation.

In view of the foregoing, at least one object is to inform a driver about the vehicle and about the vehicle functions that are available in the vehicle, in particular then, when the existence of certain functions or their practical application is not known to him. In addition, other objects, desirable features and characteristics will become apparent from the subsequent summary and detailed description, and the appended claims, taken in conjunction with the accompanying drawings and this background.

SUMMARY

A first embodiment is a device for outputting information about a vehicle, in particular of information about vehicle functions, for supporting a driver of the vehicle. The device comprises a first storage, with which the information can be retrievably stored, a first device with which a work load of the driver can be determined, a second device with which to each item of information an associated priority can be provided, an output device, with which upon a workload that is lower than a predeterminable limit workload, the information can be output with the highest priority. The second device is embodied and equipped in such a manner that after outputting an item of information by the output device, the priority of this item of information is reduced. Through the information, the independent output of the respective most important item of information is made possible at a point in time at which the driver need not concentrate on the driving situation and accordingly is capable of absorbing the information or the information can be transmitted without jeopardizing the road safety.

According to an embodiment, the device comprises a third device, with which a vehicle operating behavior of the driver can be determined, wherein the second device is embodied and equipped in such a manner that the priority/priorities of one or more than one item/s of information is/are variable as a function of the determined vehicle operating behavior. Because of this, determining priorities as a function of the vehicle operating behavior of the driver is made possible, i.e., in particular the assignment of priorities, with which the priorities do not correspond to generic or works predeterminations, but are determined by the driving behavior.

According to another embodiment, the third device comprises a second storage device, with which a history of the vehicle operating behavior for a predeterminable utilization interval of the vehicle can be stored and the priority of one or more than one items of information is/are variable as a function of the vehicle operating behavior carried out in the utilization interval. This configuration makes possible a further individualization of the list of priorities as a function of the conditions that prevail during the predeterminable utilization interval (e.g., city driving, freeway driving, etc.).

In a further embodiment, the device comprises a fourth device with which different drivers or vehicle keys can be identified. The second device is embodied and equipped in such a manner that the priorities assigned to the item of information depend on the respective identified driver or vehicle key. Because of this, an individualized assignment of the priorities as a function of the respective driver or driver collective just happening to be operating the vehicle, who/which if applicable can be identified by a vehicle key.

In a further embodiment, the second device is embodied and equipped in such a manner, that an item of information about a function of the vehicle receives a higher priority when at least one of the vehicle operating behaviors is determined, which are selected from among: at least one operating error of the function of the vehicle, utilization of the function of the vehicle never or rarely carried out, and a current non-utilization of the function of the vehicle despite current expediency.

The first device of all aforementioned embodiments and configurations can comprise one or more than one facilities that are selected from among a navigation system, a sensor device for determining a vehicle surroundings, a device for providing dynamic vehicle data, a device for determining an eye movement of the driver, and a device for determining medical data, in particular heart, breathing and/or pulse frequency of the driver, a device for determining the volume of sound within the vehicle, and a device for determining the operation of an audio device, of an audio visual device or of a telephone. The current workload of the driver can be determined on the basis of the data generated by the device/s. Because of this, technical apparatus are advantageously incorporated in the device with the help of which the workload of the driver can be determined.

The device according to another embodiment of all aforementioned embodiments and configurations can furthermore comprise an input device, with which at least one of the following operating modes of the device can be selected or set: the device can be switched on/off; an operating mode can be selected, in which an automatic output of the information with the highest priority takes place; an operating mode can be selected, in which an output of the information with the highest priority takes place only after an operator command; the output of an item of information suppressed by an operator command; an output information is no longer assigned a priority through an operator command; an item of information just output is repeated by an operator command; the limit work load can be variably predetermined. Because of this, a more individual control of the device is made possible.

A further embodiment relates to a vehicle, in particular a motor vehicle, comprising a device according to one or more of the embodiments, through which a priority-dependent output of information in the vehicle is advantageously made possible. A further embodiment relates to a method for outputting information about a vehicle to support a driver of the vehicle with the following steps: providing the information; determining a current workload of the driver; for each item of information, providing an associated priority; and outputting the information with the highest priority provided the current workload is less than a predeterminable limit workload. After the output of the information the priority of this information is reduced. The method makes possible the independent output of the respective most important information at a time at which the driver need not concentrate on the driving situation and accordingly is capable of absorbing the information or said information can be transmitted without jeopardizing the road safety.

In an embodiment of the method, a vehicle operating behavior of the driver is determined and the priority/priorities of one or more than one items of information is/are changed as a function of the determined vehicle operating behavior. Because of this, determining priorities is made possible as a function of the vehicle operating behavior of the driver, i.e., in particular the assignment of priorities is made possible. The priorities do not correspond to generic or works predeterminations, but are determined with driving behavior. According to a particular configuration, a history of the vehicle operating behavior for a predeterminable utilization interval of the vehicle is stored, and the priorities of one or more than one item/s of information is/are changed as a function of the vehicle operating behavior that took place in the utilization interval. This configuration makes possible a further individualization of the list of priorities as a function of the conditions that prevailed during the predetermined utilization interval (e.g., city driving, freeway driving).

In further embodiments of the aforementioned methods, different drivers or vehicle keys are identified and the priorities assigned to the information depend on the respective identified driver/vehicle key. This makes possible an individualized assignment of the priorities as a function of the respective driver or driver collective that just happens to be operating the vehicle, who/which if required can be identified by a vehicle key.

In a further embodiment, an information about a function of the vehicle receives a higher priority when at least one of the vehicle operating behaviors is determined which are selected from among: at least one operating error of the function of the vehicle, never or rarely used function of the vehicle, and a current non-utilization of the function of the vehicle despite current expediency.

According to particular embodiments of the method, the current workload of the driver is determined on the basis of data of at least one device, which are selected from among a navigation system, a sensor device for determining a vehicle surroundings, a device for providing dynamic vehicle data, a device for determining an eye movement of the driver, a device for determining medical data, in particular of heart, breathing and/or pulse frequency of the driver, a device for determining the volume of sound within the vehicle, and/or a device for determining the operation of an audio device, of an audio visual device or of a telephone. Because of this, technical means are advantageously incorporated in the method with the help of which the workload of the driver can be determined.

With the method according to an embodiment it can be provided that with an input device at least one operating mode can be selected or set, which for example is selected from among the following possibilities: the switching on or switching off of the method; the permitting of an automatic output of the information of the highest priority; the output of the information of the highest priority; the suppression of the currently performed output of an information through an operator command; the withdrawal of the priority of an output information through an operator command; the repetition of an information just output through an operator command; the output of the next information in response to an operator command; and/or the variable predetermining of the limit workload.

In a further embodiment, a use of the method is provided for controlling a device according to one or more of the embodiments or a vehicle, comprising a device according to one or more of the embodiments. Thus, the embodiments relates to a device and to a method for outputting information about a vehicle. This can concern details regarding the vehicle or its equipment, for example the detail of the engine power, the number of gears that are available, the maximum speed or the most economical continuous speed. Preferentially, it relates to such details regarding vehicle or its equipment which in some way can be actively operated by the driver or if required other occupants, so that the device ultimately outputs information about vehicle functions. These vehicle functions can relate to many different technical regions of the vehicle. Non-restrictive examples for these are information regarding air conditioners, ventilation systems and their operating modes, regarding gears in the case of manual transmissions or driving modes in the case of automatic transmissions, regarding operating modes such as two-wheel mode, all-wheel mode or differential lock, regarding cruise control modes, regarding flashing modes, regarding sliding roofs, window lifters and their different operating modes, regarding the different adjusting possibilities of the headlamp or windshield wiper system, of the navigation system, of the infotainment system such as for example the associated audio, video or vehicle telephone system, a wide range of assistance systems such as dozing monitoring, lane or braking control, parking aid, electronic lane stability, or regarding vehicle seats, rear benches and their adjusting and folding possibilities. In particular, at least all information regarding a vehicle or its vehicle functions can be the subject of the output of information that is contained in the operating manual that belongs to the vehicle or the associated operating instructions or additional supplementary information publications.

The information can be any type of acoustic, visual or audio visual information. Example for this are spoken texts regarding the vehicle functions, or films or animations with or without sound, in which the vehicle functions are shown or explained. Here, the information can be redundant so that it would be sufficient for example to hear the spoken audio part of audiovisual information without watching the associated visual component shown on a monitor. The information can for example be designed in a factual-neutral form, in a jocular or effectual form, or be presented by experts or automobile testers known to customers.

The information that can be output serves to support a driver of the vehicle. Here, the device comprises a first storage device, with which the information is retrievably storable. Any type of storage device usual in the field is possible, for example internal, permanently installed memory chips or hard discs. These would contain the relevant information in the factory, i.e., already ex-manufacturing works. Updates would be possible within the scope of a service workshop visit or via a vehicle-based internet access. Alternatively, removable media such as external hard discs, USB stick or memory cards are also possible. Wherein updates can be advantageously carried out by an operator even after the removal of the removable media, for example by updating from the internet at home.

The device furthermore comprises a first device, with which a workload of the driver can be determined Such means are known in the prior art, examples for this are described in DE 103 22 458 A1 and the publications cited therein. At the factory a limit workload is preferably preset. If the actually determined current workload exceeds this limit workload, no outputting of any information is permitted for the purpose of enduring the road safety. It can be provided that a driver, or generally an operator of the vehicle, can individually set a limit workload of the driver. Thus, a very low limit workload can be predetermined for example for learner drivers, since it must be assumed that even with low workload of a learner driver the road safety could be endangered through additionally presented information. Conversely, a higher limit workload can be predetermined for an experienced driver, since said driver is not distracted in a road safety-jeopardizing manner through additional information output by the device. Obviously, an extremely high limit workload can also be set when it is ensured that it is not in fact the driver but another vehicle occupant who receives the information output via the device, i.e., informs himself via the vehicle information while the driver concentrates on the traffic but not on the output information, so that the road safety is still ensured.

The device furthermore comprises a second device, with which an associated priority can be provided to each item of information. For example, in the simplest case, information that can be output and is supplied by the factory can also be assigned priorities by the factory. Because of this, empirical values of development, marketing or customer care departments of the vehicle manufacturers can be included in particular, which functions of the vehicle are most likely to be unknown in customer circles, which systems/system functions are expected to cause most operating errors in customer circles, or which information would bring about the greatest benefit to the customer if he were aware of the associated vehicle functions.

The device furthermore comprises an output device, with which with a workload that is lower than the predeterminable limit workload, the information with the highest priority can be output. The output device can be any device known in the specific field, with which acoustic, visual or audiovisual information can be played back, for example a car radio or its output unit, a monitor of an infotainment system, a mobile phone connected to the infotainment system or the vehicle telephone system, or a head up display. The simultaneous use of a plurality of output device is also included in the invention, so that for example an acoustic part of the information is output via loudspeaker while a visual part is output on a monitor.

The second device of the device is therefore embodied and equipped in such a manner, that following output of an item of information through the output means, the priority of this information is reduced. Through this it is ensured that information of its output receives a lower priority to the other items of information in relevant terms, and thus the probability for the output of other items of information not yet output or not output immediately before, is increased. Reducing the priority thus has to be understood in relevant terms and can for example be effected in that the information is assigned a new numerical value, which in contrast with the previous value stands for a lower priority. However, it can be equally effected also in that all other items of information with the exception of the item of information just output are each assigned numerical priority values, which in contrast with their previous values, stand for a higher priority. After the output of an item of information, it can be assigned in particular the least possible priority, so that a renewed output can be affected only then, when all other items of information have been output beforehand. Alternatively, it can no longer be assigned any priority at all, so that it is no longer output after completed output, provided it is not again assigned a priority.

The first storage device, the first device for determining a workload of the driver, the second device for providing a priority for each item of information, and the output device can represent independent components of the vehicle equipment. Alternatively, all or some of these devices can be part of the vehicle equipment, which are also used for other tasks. Thus, the first device for determining a workload can for example be a device for determining vehicle data, which are used in a different connection for the control and/or regulation of the driving dynamics, the storage device and the second device for providing a priority for each item of information can be assigned a vehicle central computer, and the output device can be realized within the scope of the vehicle's own infotainment system with its loudspeakers, various monitors and/or other visual displays and connections for additional or alternative output devices.

The device can comprise a third device, with which a vehicle operating behavior of the driver can be determined, wherein the second device is embodied and equipped in such a manner that the priority/priorities of one or more than one items of information is/are variable as a function of the determined vehicle operating behavior. For example, the second device can detect how often a vehicle function was utilized or if it has already been utilized at all. Through this, an individualization of the priorities can be achieved in particular. While with priorities predetermined ex-works, i.e., priorities predetermined by the vehicle manufacturer, generic empirical values with respect to the degree of familiarity of vehicle functions are included, priorities can be assigned with the help of the third device, which are based on the actual driving behavior of a driver. Should the driver for example very early on utilize a function whose associated item of information has a very low priority, this priority can thus be immediately set to a lower value and thus be updated. By contrast, this increases the probability that items of information regarding other functions not yet utilized are output at an earlier point of time than would be the case with a non-updated priority of the item of information regarding the already utilized function. Functions still unknown to the driver are thus advantageously introduced to the driver even more efficiently. According to a particular configuration, the third device comprises a second storage device with which a history of the vehicle operating behavior for a predeterminable utilization interval of the vehicle can be stored and the respective priorities of one item or more than one items of information can be varied as a function of the vehicle operating behavior that took place in the utilization interval. For example, a holiday trip with high freeway component can be selected as utilization interval. If during this, vehicle functions such as cruise control or navigation functions are utilized; other functions can receive a higher priority and can be introduced to the driver following their downgrading in the priority. A deletion of the history of the vehicle operating behavior can for example again use priorities that are predetermined ex-works as a base, so that upon a new utilization interval, all items of information can again be presented according to an originally provided priority, provided no new grading of the priorities based on the vehicle operating behavior take place.

Optionally, the device can comprise a fourth device with which different drivers or vehicle keys can be identified. In this case, the second device is embodied and equipped in such a manner that the priorities assigned to the items of information depend on the respective identified driver or vehicle key. Here, methods usual in the special field can be used for the individualization of drivers. In the simplest case, an individualization can be achieved in that each driver receives an individual vehicle key, for example in the form of an ignition key, which is unambiguously identifiable by the vehicle electronic device or an identification code that is entered in a vehicle computer before utilizing the vehicle. Further more complex types of individualization comprise, for example, the face recognition of drivers, as they are described for example in DE 199 52 854 C1. In addition, individualization can also be based on driver collectives instead of individual persons. For example, in a vehicle fleet, drivers, which drive international or long distances, can be assigned vehicle keys other than those of drivers who perform the city trips or customers of a car hire operation can be assigned different driver collectives. Thus, in the case of customers that are families with children, the infotainment systems of the vehicle can be assigned higher priorities for example. Because of this, the output of items of information regarding these infotainment systems would be brought about early on, so that the parents are familiar with their mode of operation and keep their children occupied with entertainment programs immediately during the trip. In the case of individual drivers wishing to travel long distances, items of information regarding functions such as cruise control or more energy-saving driving would be given higher priority.

In particular embodiments, the vehicle operating behavior, based on which a priority can be provided through the second means, is selected from among at least: an operating error of the function of the vehicle, utilization of the function of the vehicle never or rarely used, and/or current non-utilization of the function of the vehicle despite current expediency. Determining operating errors for concrete cases can be easily implemented by the person skilled in the art. For example, actuating the windshield wipers at a time when the vehicle's own rain sensors do not indicate any rain would be rated as operating error. Items of information regarding the windshield wiper lever would thus be assigned a higher priority at the instant of the operating error, preferentially even the highest priority. Because of this, an item of information regarding the windshield wiper system and its actuating element would be output promptly or immediately, so that on the part of the driver no operating error would take place in the future. To give another example, the faulty use of an off-road gear with high gear ratio in the case of an off-road vehicle could be detected by way of an excessively high rotational speed and items of information regarding the practical use of the off-road gear would be assigned a higher or the highest priority. A utilization which has been rare or has never been utilized can simply take place via the recording of the usages of the respective function during the vehicle life, of a utilization interval or of a utilization interval assigned to a driver or vehicle key. It is a sign that the driver does not know the vehicle function or not to its full extent and accordingly does not fully utilize the potential of his vehicle. If a driver for example utilizes all functions of his vehicle with the exception of a single function, this function by force would be given the highest priority and the limit workload would be output during the next undershooting. By this it would be ensured that the driver definitely knows the function and in the following, non-utilization can at least not be attributed to a lack of knowledge. Establishing a current non-utilization despite expediency can likewise be easily implemented for individual constellations by the person skilled in the art. For example, upon a vehicle interior temperature of approximately 30° C. and air conditioner not switched on information regarding the air conditioner can be set a higher or the highest priority. Thus, the driver would promptly or immediately receive an item of information that his vehicle includes an air conditioner with which the temperature could be easily lowered. In particular, when determining a current non-utilization despite current expediency it can be provided that the item of information regarding the function concerned is immediately assigned the highest priority, even when it, if applicable, previously held the lowest possible priority. Because of this, the device according to the invention is not only suitable for a rather subordinate transfer of useful information regarding vehicle functions which become expedient rather during future utilizations of the vehicle, but also for the highly topical conveying of such items of information in critical situations.

The first device of all aforementioned embodiments and configurations can comprise an evaluation device as well as one or more than one devices, which are selected from among: a navigation system, a sensor device for determining a vehicle surroundings, a device for providing dynamic vehicle data, a device for determining an eye movement of the driver, and a device for determining medical data, in particular of heart, breathing and/or pulse frequency of the driver. The current workload of the driver can be determined on the basis of data generated through the device or the devices in a manner that can be easily determined and implemented by the person skilled in the art. For example, data of the navigation system can make possible a conclusion regarding the workload. For example with current, even freeway driving a low workload is used as a base, and a higher workload in the case of winding country road driving or city driving with frequent directional changes or stop-and-go traffic. A vehicle surroundings determined by sensor would for example indicate a low workload when daylight, a road free of curves and/or nice weather are detected, a correspondingly higher workload in the case of night, fog or poor weather driving or with winding or uneven road. Dynamic vehicle data, which indicate low workload, would for example be low and/or steady travelling speed, in frequent gear change and few directional changes. Medical data indicating low workload would for example be rare or few abrupt eye movements of the driver, a low and/or even pulse or breathing frequency. With a further possible device, the volume of sound within the vehicle could be detected. A high volume of sound, indicating an environment with a high stress factor or an animated conversation in the vehicle, would indicate a high workload. With the help of a further device, the operation of an audio device, of an audio-visual device or of a telephone could be detected. If there were such an operation, this would be rated as a high workload since it has to be assumed that the driver concentrates on the items of information reproduced by these devices and does not wish to be disturbed by an item of information to be output by the device. In particular, a telephone call would be rated as a high workload since in this case any kind of interruption would be rated as disturbing. The evaluation device, for example a vehicle computer, detects individual or a plurality of this data and from this determines, if required following the linking and weighted evaluation of a plurality of data the current workload of the driver.

The device of all aforementioned embodiments and configurations can furthermore comprise an input device, with which at least one of the operating modes of the device shown in the following can be selected or set. For example, the device can be switched on/off so that for a certain trip or a period of time the device can stay switched off. Accordingly, an output of items of information and a corresponding reduction of the associated priority or a re-assignment of priorities would not take place during the relevant trip or within the relevant period of time, but only again after the device has been switched on. Obviously, a switched-on device can also be switched off during the trip at any time, while the priorities would be optionally reset to the basic setting ex-works or preferentially the priorities at the point of time the switching-off would be stored. According to a further operating mode, an automatic output of the item of information with the highest priority would take place, wherein it could be optionally determined ex-works or set by the driver or user, how of an output may take place during a trip or a utilization interval. For example, a certain number of outputs per trip, within a selectable period of time or a selectable covered distance could be permitted. The number can then be set to zero so that during the relevant trip, the relevant period of time or relevant distance covered, no output would be permitted. If the driver however wishes to receive information, he can determine a suitable number up and including one output. According to a further operating mode, an output of the item of information with the highest priority would only take place after an operator command. For example, the driver or user could request the output of an item of information or authorize its future output in advance, or the device could indicate that the output of an item of information is to take place, wherein the actual output takes place only then, when the driver or user agrees through an operator command. An operator command can assume any form known in the special field, for example the actuation of a key or of a switch, the touching of a corresponding field on a touch-sensitive monitor, or through a speech command. In a further operating mode, a currently performed output of an item of information can be suppressed through an operator command, when for example there is no interest in the information or the driver estimates his workload as being too high for being able to receive the information. An output item of information can no longer be assigned a priority through an operator command in a further operating mode. Because of this, the information would be excluded as possible information to be output for as long as the information would not be reassigned a priority, for example through resetting the priorities to the works setting or a targeted re-assignment of a priority. According to a further operating mode, the repetition of an item of information that has just been output can be ordered through an operator command. As example for a further operating mode, the input device can be used in order to variably predetermine the limit workload. For example, a selection of different sub-modes can take place. Thus, a sub-mode for freeway driving for learner drivers could provide the output of information only when the speed moves in a moderate range of up to a maximum of approximately 120 km/h while in a sub-mode for experienced drivers, an output would still be permissible even at higher speeds. Alternatively, the driver could specifically enter parameters and by doing so define an individual limit workload customized for him, storing it if required for later reuse. For example, a driver could determine up to which limit he wishes to receive items of information of the device by way of the limit workload, if he, according to the abovementioned examples, happens to use an audio device, for example radio or listens to a CD, or conducts a telephone call. According to a further operating mode, the next item of information is output upon an operator command. Thus, the driver for example during a traffic light stop has the possibility through an operator command of having the next item of information output, or through further subsequent operator commands, a suitable number of further items of information, even if a predetermined maximum number of information outputs per unit time would provide that the next output would only be permitted significantly later on. Such an operator command can thus be interpreted by the first means to mean that there is currently no workload and/or that a predetermined limitation of the number of items of information to be output is currently disabled.

A vehicle, in particular a motor vehicle, is also provided that comprises a device according to the aforementioned embodiments. The device in this case can preferably be already installed in the vehicle at the factory. However, the use of a device as retrofit kit is also conceivable, which is installed in an existing vehicle. Insofar as required, the device would then preferentially receive required data such as for example sensory data for determining a vehicle surroundings, dynamic vehicle data or data recorded by the vehicle regarding eye movement or medical data of the driver through access to a vehicle central computer.

Furthermore, a method is provided for outputting information regarding a vehicle to support a driver of the vehicle during an operation of the vehicle, comprising the following steps: providing the information; determining a current workload of the driver; for each item of information, providing an associated priority; and outputting the information with the highest priority, provided the current workload is lower than a predeterminable work limit load. Following the output of the information, its priority is reduced.

The method makes possible the independent output of the respective most important information at a point of time, at which the driver need not concentrate on the driving situation and accordingly, is receptive to the information or said information can be transmitted without jeopardizing the road safety. Here, the method takes place preferentially such that during the operation of the vehicle the current workload of the driver is determined continuously, at periodic intervals or at irregular intervals. The information is output only when the limit workload is undershot. The "operation" of the vehicle in this case must be interpreted widely and obviously comprises a vehicle with running engine, but can also comprise a vehicle with stationary engine with ignition switched on or a vehicle with ignition switched off, provided a driver is present in the vehicle.

Providing the information includes the access to information already available, which for example is stored on a vehicle-internal memory chip or a vehicle-internal hard disc, however the incorporation of information which can be made available additionally or alternatively while carrying out the method for example by means of a removable media. With respect to possible concrete configurations in the determination of the workload or the providability of a priority, reference is exemplarily made to the corresponding explanations within the scope of the device.

Within the scope of the method, it can be optionally provided that a vehicle operating behavior of the driver is determined, and the priority/priorities of one or more than one items of information is/are varied as a function of the determined vehicle operating behavior. Furthermore, a history of the vehicle operating behavior for a predeterminable utilization interval of the vehicle can be optionally stored. The priority/priorities of one or more than one item/s of information is/are changed as a function of the vehicle operating behavior that took place during the utilization interval. With respect to possible concrete configurations with both optional possibilities, reference is exemplarily made to the corresponding explanations within the scope of the device.

Furthermore, it can be provided within the scope of the method, which different drivers or vehicle keys are identified, and the priorities assigned to the items of information depend on the respective identified driver/vehicle key. With respect to possible concrete configurations, reference is exemplarily made to the respective embodiments within the scope of the device.

Preferentially, it is provided within the scope of the method, that an item of information receives a higher priority via a function of the vehicle, when at least one of the following vehicle operating behaviors is determined, which are selected from amongst at least one operating error of the function of the vehicle, utilization of the function of the vehicle is rare or has never been utilized, and a current non-utilization of the function of the vehicle despite current expediency. Here, too, reference, with respect to possible concrete configurations, is exemplarily made to the corresponding explanations within the scope of the device.

According to another embodiment of the method, the current workload of the driver is determined on the basis of data of at least one device, which is selected from among a navigation system, a sensor device for determining a vehicle surroundings, a device for providing dynamic vehicle data, a device for determining an eye movement of the driver, a device for determining medical data, in particular heart, breathing and/or pulse frequency of the driver, a device for determining the volume of sound within the vehicle, and/or a device for determining the operation of an audio device, of an audiovisual device or of a telephone.

With the method it can be provided that with an input device, at least one operating mode can be selected or set, which is selected from among: the switching on or switching off of the method; the permitting of an automatic output of the item of information with the highest priority; the output of the item of information with the highest priority only after an operator command; the suppression of the currently output information through an operator command; the withdrawal of the priority of an output item of information through an operator command; the repetition of an item of information just output through an operator command; the output of the next information upon an operator command; and/or the variable predetermining of the limit workload.

With respect of the method, reference is also made to the above disclosures of the device and its advantageous further developments, which analogously can be transferred to the method as well. Advantageously, the method can be used for controlling a device or a vehicle comprising a device.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
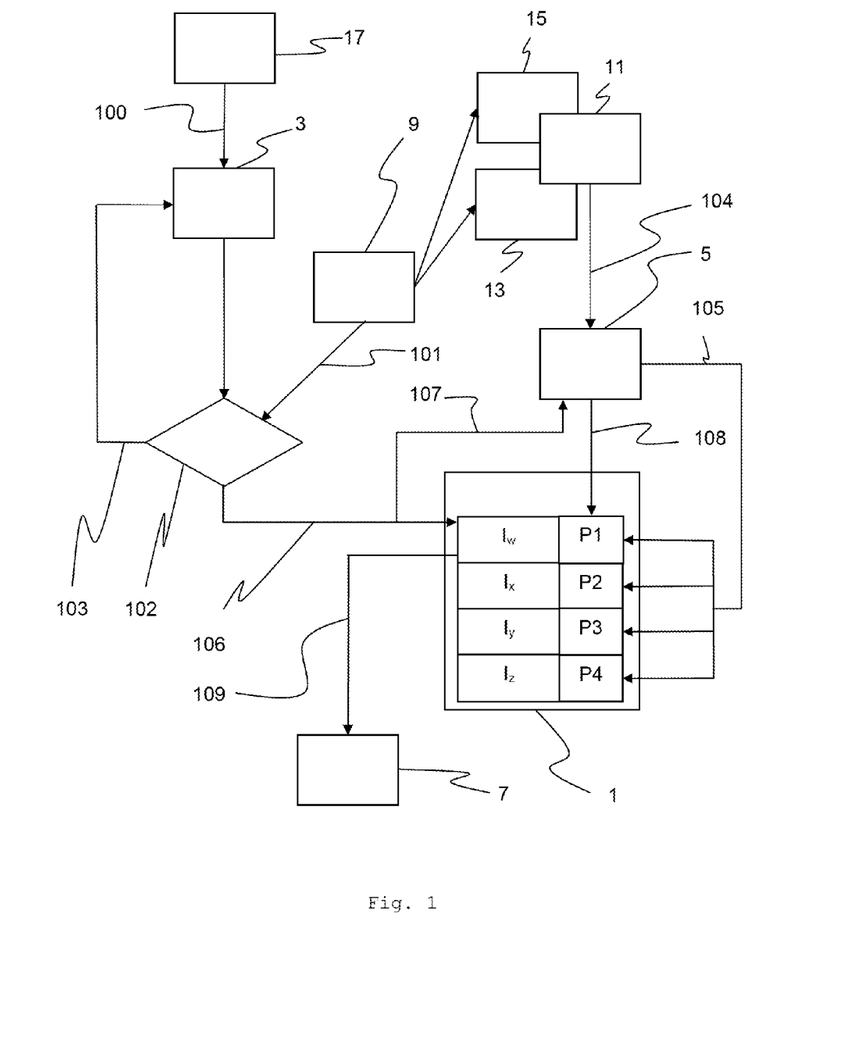
FIG. 1 is a schematic representation of a possible method sequence.

The following examples, which are connected to FIG. 1, and which explain in detail, additionally serve for the further explanation of the embodiments

EXAMPLE 1

According to an embodiment, the device, with which a vehicle is equipped, comprises a first storage device 1 in the form of one or a plurality of memory chips that can be read out and preferentially newly written on. Optionally, items of information that can be read out can be retrievably storable as substitute or addition on a removable media, in particular a USB stick or a memory card. The first device 3 for determining the workload of a driver is at least one vehicle-based device for providing dynamic vehicle data, with which the speed, the acceleration and if required further data such as yaw, roll, pitch or lift rates are determined, which can also be used for other purposes, for example the control of the vehicle stability of the shifting operations with automatic transmission. The second device 5 for providing the priority is present in the form of a vehicle central computer. As input device 9, a keypad or alternatively a touch-sensitive monitor is provided, on which a corresponding operating menu can be displayed. The vehicle central computer determines the workload of the driver based on the dynamic vehicle data. The workload is considered to be the lower, the more even with respect to direction and/or speed change and/or the lower the vehicle moves, and thus assumes the task of the first device 3. Furthermore, it assumes the function of the second device 5, in that it assumes the priorities assigned ex-works to the retrievable items of information, outputting the item of information with the respective highest priority on the infotainment system of the vehicle acting as output device 7 with its at least one monitor and its at least one loudspeaker. If it is predetermined through the input device 9 that the output is to take place as a function of a vehicle operating behavior, the vehicle computer determines the vehicle operating behavior and in its capacity as second device 5, makes available an associated priority for each item of information, which can differ from the priority provided ex-factory. If additional operating modes are selected through the input device 9, for example the automatic output of the item of information with the highest priority, if required, subject to the indication of further parameters such as a time or route interval for each item of information, such will be suitably taken into account by the vehicle central computer. Following the output of an item of information, the vehicle central computer assigns this information a lower priority.

EXAMPLE 2

A driver puts his newly bought vehicle into operation for the first time. The device or the method is activated. Ex-factory it is provided that an item of information is output once within 15 minutes if the limit workload is not exceeded. In the first quarter of an hour the driver receives, via the output device 7, a loudspeaker, an item of information regarding the possibilities of the infotainment system and after expiration of a further 15 minutes, an item of information regarding the air conditioner. By way of operator command, the driver requests a repetition of this item of information, since the temperature in the vehicle increases and the driver intends to start putting the air conditioner into operation soon.

EXAMPLE 3

Having received the repeated item of information regarding the air conditioner, the driving situation for the driver from example 1 changes so that during the next 30 minutes, the limit workload predetermined ex-factory is exceeded. Thereafter, the workload again drops below the limit value, upon which the information with the currently highest priority is immediately output. Following this, the driver increases the limit workload with an input device 9, since he is experienced and not distracted in a dangerous way through the output information and determines that an item of information may be output every 10 minutes.

EXAMPLE 4

A driver uses his vehicle on a snow-slippery road, while the device is switched on or the method is carried out. The vehicle has an all-wheel drive that can be switched on, wherein the first storage device 1 also keeps ready suitable information regarding the all-wheel drive. The vehicle sensor device now determines a slip of the drive wheels. Since the all-wheel drive is not switched on at the moment, this is rated by the device or the method as current non-utilization despite current expediency. Since through the all-wheel drive the road safety is substantially improved or an uncontrollable driving situation could be prevented, the second device 5 assigns the information regarding the all-wheel drive the highest priority immediately. The device or the method determines that the current workload of the driver is below a predetermined limit workload. Thus, the output device 7 outputs an item of information divided in two, wherein the driver is informed via a spoken message that an all-wheel drive that can be switched on is available, and with an audiovisual item of information on a monitor of the infotainment system, further details regarding the all-wheel drive and its activation and deactivation are displayed.

EXAMPLE 5

A driver has been driving for an extended period of time with a relatively constant speed on a freeway. The device is switched on or the method is carried out, but does not use the cruise control available in the vehicle for maintaining a desired speed. This is rated by the device or the method as current non-utilization despite current expediency. The second device 5 thus assigns the information regarding the all-wheel drive the highest priority immediately. The vehicle now suddenly encounters a strong side wind, so that the driver has to perform evasive steering movements. This is registered by a device 17 for providing dynamic vehicle data, as a result of which the first device 3 now determines an increased workload of the driver. Since this is above the limit workload, the information regarding the cruise control is not output initially. Once the driving situation has re-normalized, the data is output. The driver now receives items of information regarding the cruise control via an audiovisual presentation and learns how he can enter a desired speed. He is informed, furthermore, how he can program warning sounds upon exceeding of a predeterminable maximum speed.

FIG. 1 shows a possible method sequence of a method. A device 17 for providing dynamic vehicle data transmits this dynamic vehicle data in a first step 100 to a first device 3 for determining the workload. In a step 102, the determined workload is compared with a predetermined limit workload or a limit workload likewise variably predetermined via an input device 9. If the limit workload is exceeded, the method branches off in step 103 to the first device 3 again, which from the device 17 for providing dynamic vehicle data, continuously or at regular intervals receives updated dynamic vehicle data. A third device 11 for determining the vehicle operating behavior collects data regarding the operating behavior. The third device 11 is assigned a fourth device 15 for driver assignment and a second storage device 13, with which if required the vehicle operating behavior is collected as a function of a certain driver or as a function of a predeterminable utilization interval. Predeterminations with respect to the driver assignment or the utilization interval can, if required, be input by the driver via the input device 9. In a step 104, data regarding the vehicle operating behavior are transmitted to the second device 5 for providing a priority. In a step 105, assigns priorities P1, P2, P3 and P4 to items of information 1W, 1X, 1Y and 1Z which are retrievably stored on a first storage device 1 in a step 105. As soon as in step 102 an undershooting of the predetermined limit workload is determined, the method branches off to a step 106, with which the information with the highest priority, in this case the information 1W, is retrieved from the first storage device 1 and in a step 109 transmitted for outputting to an output device 7. In addition to this, triggered by a step 107, a reduction of the previous priority of the output information 1W from P1 to a lower priority (not shown in FIG. 1) is initiated by the second device 5.

Figure 2:
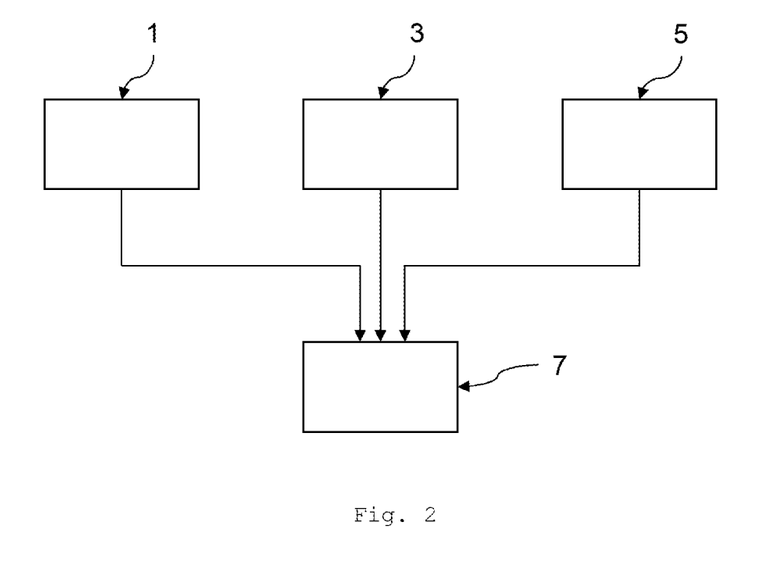
FIG. 2 is a schematic representation of a device according to an embodiment.

FIG. 2 shows a device for outputting information regarding a vehicle, in particular information regarding vehicle functions, to support a driver of the vehicle. The device comprises a first storage device 1, with which the information can be retrievably stored, a first device 3, with which a workload of the driver can be determined, a second device 5, with which an associated priority can be provided for each item of information, and an output device 7, with which in the case of a workload that is lower than a predeterminable limit workload, the item of information with the highest priority can be output. The second device is embodied and equipped in such a manner that after the output of an item of information through the output device, the priority of this item of information is reduced.

Figure 3:
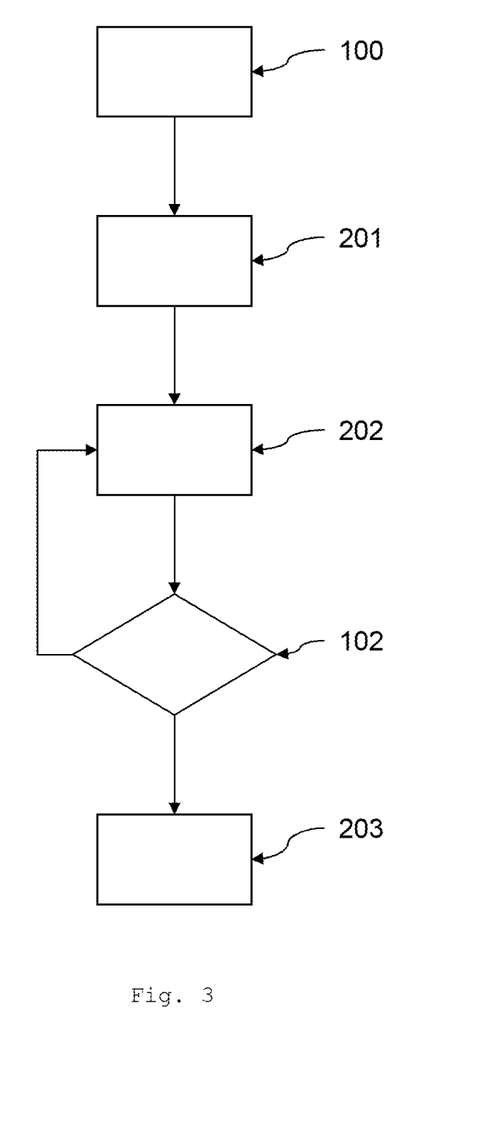
FIG. 3 is a schematic representation of a method according to an embodiment.

FIG. 3 shows a schematic representation of a method sequence for outputting information regarding a vehicle to support a driver of the vehicle. The method comprises the following method steps. In a first step 100, the items of information are provided. In a second method step 201, an associated priority is provided for each item of information. In a third method step 202, a current workload of the driver is determined. In a fourth method step 203, provided the current workload is lower than a predeterminable limit workload (see 102), the item of information with the highest priority is output. Following the output of the item of information the priority of this item of information is reduced.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for outputting information regarding vehicle functions, comprising:
   a first storage device that is configured to retrievably store the information;
   a first device that is configured to determine a driver workload;
   a second device that is configured to associate a priority for each item of information of items of information;
   a third device having a second storage device that is configured to store a history of a vehicle operating behavior for a predeterminable utilization interval of the vehicle, the third device configured to determine at least one of the vehicle operating behavior and a driver identification, wherein the second device is configured to change a priority of one or more item of information as a function of at least one of the vehicle operating behavior that occurred in the predeterminable utilization interval and the driver identification; and
   an output device that is configured to output an item of information with a highest priority when a workload that is lower than a predeterminable limit workload,
   wherein the second device is configured such that following the output of the item of information by the output device, the priority of the item of information is reduced.

2. The device according to claim 1, wherein,
   the third device is configured to determine a driver operating behavior; and
   the second device that is configured to change a priority of one or more item of information as a function of the driver operating behavior.

3. The device according to claim 1, wherein the driver identification comprises:
   a vehicle key,
   wherein the second device is configured such that priorities assigned to the item of information depend on the vehicle key.

4. The device according to claim 2, wherein the second device is configured such that the item of information regarding a function of the vehicle receives a higher priority when a current non-utilization of the function of the vehicle despite current expediency.

5. The device according to claim 1, wherein the first device comprises an evaluation device and a sensor device that is configured to determine a surrounding of the vehicle.

6. The device according to claim 1, further comprising an input device with which at least one of an operating modes of the device is selectable, the operating modes comprising:
   the device can be switched on/off;
   an operating mode, in which an automatic output of the item of information with the highest priority, takes place;
   a second operating mode, in which an output of the item of information with the highest priority takes place only after an operator command;
   a currently performed output of the item of information is suppressed through the operator command;
   an output item of information is no longer assigned the priority through the operator command;
   the item of information that is output is repeated through the operator command;
   a next item of information is output in response to the operator command; or
   limit the workload can be variably predetermined.

7. A method for outputting information regarding a vehicle, comprising:
   providing items of information;
   providing an associated priority to each of the items of information;
   determining a driver workload;
   determining at least one of a vehicle operating behavior and a driver identification;
   storing a history of the vehicle operating behavior for a predeterminable utilization interval of the vehicle;
   changing the priority of one or more of the items of information as a function of at least one of the vehicle operating behavior that occurred in the predeterminable utilization interval and the driver identification;
   outputting an item of information with a highest priority when the driver workload is lower than a predeterminable limit workload; and
   reducing a priority of the item of information as the driver workload is lower than the predeterminable limit workload.

8. The method according to claim 7, further comprising:
   determining the driver identification based on a vehicle key; and
   assigning priorities to the items of information based at least in part on the vehicle key.

9. The method according to claim 7, wherein the item of information regarding a function of the vehicle receives a higher priority when a vehicle operating behavior is determined that at least one operating error of the function of the vehicle.

10. The method according to claims 7, wherein the driver workload is determined with data of a sensor device for determining a vehicle surroundings.

11. The method according to claim 7, further comprising selecting at least one operating mode comprising an input device for switching-on.

12. A computer readable medium embodying a computer program product, said computer program product comprising:
   a program for outputting information regarding a vehicle, the program configured to:
   provide items of information;
   provide an associated priority to each of the items of information;
   determine a driver workload;
   determine at least one of a vehicle operating behavior and a driver identification;
   store a history of the vehicle operating behavior for a predeterminable utilization interval of the vehicle;

change the priority of one or more of the items of information as a function of the vehicle operating behavior that occurred in the predeterminable utilization interval and the driver identification;

output an item of information with a highest priority when the driver workload is lower than a predeterminable limit workload; and reduce a priority of the item of information as the driver workload is lower than the predeterminable limit workload.

13. The computer readable medium embodying a computer program product according to claim 12, the program further configured to:

determine the driver identification based on a vehicle key; and assign priorities to the items of information based at least in part on the vehicle key.

14. The computer readable medium embodying a computer program product according to claim 12, wherein the item of information regarding a function of the vehicle receives a higher priority when the vehicle operating behavior is determined that at least one operating error of the function of the vehicle.

15. The computer readable medium embodying a computer program product according to claim 12, wherein the driver workload is determined with data of a sensor device for determining vehicle surroundings.

\* \* \* \* \*